US 6,605,347 B2

(12) United States Patent
Amano et al.

(10) Patent No.: US 6,605,347 B2
(45) Date of Patent: Aug. 12, 2003

(54) PRESSURE-SENSITIVE ADHESIVE COMPOSITION AND PRESSURE-SENSITIVE ADHESIVE SHEET THEREOF

(75) Inventors: Tatsumi Amano, Osaka (JP); Masahiko Ando, Osaka (JP); Waka Sakaitani, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/024,276

(22) Filed: Dec. 21, 2001

(65) Prior Publication Data

US 2002/0120093 A1 Aug. 29, 2002

(30) Foreign Application Priority Data

Dec. 27, 2000 (JP) .................................. 2000-396806

(51) Int. Cl.[7] .............................. B32B 15/04; B32B 7/12
(52) U.S. Cl. ........................ 428/355 RA; 428/343; 428/355 R; 428/355 AC; 525/32.1; 525/32.2; 525/33; 525/34; 525/41; 525/43
(58) Field of Search .................... 428/343, 355 R, 428/355 RA, 355 CN, 355 N, 355 AC; 525/11, 32.1, 32.2, 33, 34, 41, 43

(56) References Cited

U.S. PATENT DOCUMENTS

| 4,554,324 A | * | 11/1985 | Husman et al. ............. 525/301 |
| 6,093,464 A | * | 7/2000 | Tokunaga et al. ............ 428/352 |
| 6,218,006 B1 | * | 4/2001 | Tokunaga et al. ........ 428/355 AC |
| 2001/0021451 A1 | | 9/2001 | Tokunaga et al. | |

FOREIGN PATENT DOCUMENTS

| EP | 0 816 462 A1 | 1/1998 | |
| JP | 4-342785 | 11/1992 | |
| JP | 04-342785 | * 11/1992 | .......... C09J/175/06 |
| JP | 5-295071 | 11/1993 | |
| JP | 8-259680 | 10/1996 | |
| JP | 9-59587 | 3/1997 | |
| JP | 09-235537 A | 9/1997 | |
| JP | 10-45884 | 2/1998 | |
| JP | 10-87799 | 4/1998 | |
| JP | 11-1674 | 1/1999 | |
| JP | 11-21533 | 1/1999 | |
| JP | 2000-073036 A | 3/2000 | |

* cited by examiner

Primary Examiner—James J. Seidleck
Assistant Examiner—Travis B Ribar
(74) Attorney, Agent, or Firm—Sughrue Mion, PLLC

(57) ABSTRACT

A pressure-sensitive adhesive composition is described, which comprises a polyester having an improved molecular structure and can find wide applications, which polyester has both a good mechanical strength and a good flexibility, is obtained from starting material components essentially comprising an aliphatic diol having a carbonate structure in the main chain thereof, and at least one of a polyhydric alcohol having three or more hydroxyl groups and a polycarboxylic acid having three or more carboxyl groups, and has a number average molecular weight of 5,000 or more and a degree of dispersion of 2.2 or more.

4 Claims, No Drawings

PRESSURE-SENSITIVE ADHESIVE COMPOSITION AND PRESSURE-SENSITIVE ADHESIVE SHEET THEREOF

FIELD OF THE INVENTION

This invention relates to a polyester-based pressure-sensitive adhesive composition and a pressure-sensitive adhesive sheet prepared therefrom in the form of sheet or tape.

BACKGROUND OF THE INVENTION

Polyesters can be imparted a wide variety of excellent properties such as an excellent heat resistance, an excellent chemical resistance and an excellent mechanical strength by properly combining diol components, dicarboxylic acid components or hydroxycarboxylic acid components, and have find wide applications in films, fibers, paints, coating materials, adhesives, etc.

As polyester-based adhesives, there have been known, for example, hot-melt adhesives and thermosetting adhesives in which a curing agent is used to react by heating. In order to maintain or exhibit adhesive properties, these adhesives have a considerably higher melting point (softening point) than room temperature (23° C.), or are in a considerably highly crosslinked state, thus being in an extremely hard state at about room temperature.

Therefore, the above-described adhesives involve the problem that a heating apparatus is required or a working load such as a heating operation is required for obtaining the adhesive function, leading to an increase in cost. From this standpoint, application of a pressure-sensitive adhesive which can exhibit adhesive properties under a slight pressure in a short time has been demanded and, recently, there has been made an application as a pressure-sensitive adhesive as is disclosed in JP-A-11-21340 (The term "JP-A" as used herein means an "unexamined published Japanese patent application").

In general, as is disclosed in, for example, D. Satas, Adhesive Age, 31 (9), 28 (1988), pressure-sensitive adhesives are designed to have a storage elastic modulus at room temperature [G'] of about $1 \times 10^5$ Pa or lower than that and, in case where the storage elastic modulus at room temperature [G'] exceeds $5 \times 10^5$ Pa, a high tack required as a pressure-sensitive adhesive is not obtained, and sufficient adhesive performance can not be obtained in a short time (about 10 seconds) from its application.

Therefore, in the case of using a polyester in a pressure-sensitive adhesive, the polyester is required to have an enough flexibility as one of physical properties. Thus, it can be said to be effective to use an aliphatic polyester having a low glass transition temperature, which has a polyester structure of having hydrocarbon groups in the side chains, as disclosed in JP-A-11-21340. However, aliphatic polyesters having hydrocarbon groups in the side chains generally have a weak mechanical strength and is inferior in cohesive force which is another necessary function as a pressure-sensitive adhesive known by the definition in JIS that "adhesion can be completed by merely applying a slight pressure at room temperature for a short time without using water, solvents and heat and, due to enough cohesive force and enough elasticity, an adherend can be peeled off from a hard, smooth surface in spite of the strong adhesion".

Thus, for the purpose of strengthen the mechanical strength, it is necessary to conduct crosslinking treatment using a crosslinking agent such as polyisocyanate and, in JP-A-11-21340, too, the crosslinking treatment using polyisocyanate is conducted. However, it is difficult to adjust the amount of a crosslinking agent so as to obtain both a good mechanical strength and a good flexibility at the same time. In case where the amount of the crosslinking agent is increased to preferentially obtain an increased mechanical strength, there results a poor flexibility, leading to poor adhesion properties to a rough surface. On the other hand, in case where the amount of the crosslinking agent is decreased to obtain an increased flexibility, there results a poor mechanical strength which is unsuitable for the use of fixing parts of electric products or fixing parts of automobiles, which use requires heat resistance and durability.

Under such circumstances, an object of the invention is to obtain a pressure-sensitive adhesive composition capable of finding wide applications and a pressure-sensitive adhesive sheet prepared therefrom by improving molecular structure of the polyester per se to attain both a good mechanical strength and a good flexibility at the same time.

SUMMARY OF THE INVENTION

As a result of intensive investigations to achieve the above object, the inventors have found that mechanical strength of a polyester is increased and heat resistance thereof is improved by using a specific aliphatic diol having a carbonate structure having a high molecular cohesive force as a starting material component of the polyester. In addition, the inventors have also found that, by using a polyhydric alcohol having three or more hydroxyl groups or a polycarboxylic acid having three or more carboxyl groups together with the above-described starting material component, there is obtained a polyester having branched chains and having a wide molecular weight distribution of 2.2 or more in degree of dispersion (weight average molecular weight/number average molecular weight), which polyester has an improved flexibility, particularly without spoiling the mechanical strength in comparison with polyesters of less than 2.2 in degree of dispersion having a conventional structure formed by using only bi-functional components of a diol component and a dicarboxylic acid component.

As is described above, the inventors have found that polyesters having both a good mechanical strength and a good flexibility can be obtained by using, as starting components of the polyesters, a particular aliphatic diol having a carbonate structure in combination with a polyhydric alcohol having three or more hydroxyl groups or a polycarboxylic acid having three or more carboxyl groups, and that there are obtained a pressure-sensitive adhesive composition containing the polyester and a pressure-sensitive adhesive tape made therefrom having satisfactory heat resistance and adhesion properties to a rough surface, thus having achieved the invention based on the finding.

That is, the invention relates to a pressure-sensitive adhesive composition which comprises a polyester obtained from starting material components essentially comprising:

(A) an aliphatic diol having in the main chain a structural unit represented by the following formula (1):

(1)

wherein R represents a straight or branched hydrocarbon group having 2 to 20 carbon atoms; and (B) at least one of a polyhydric alcohol having three or more hydroxyl groups and a polycarboxylic acid having three or more carboxyl groups, said polyester having a number average molecular weight of 5,000 or more and a degree of dispersion (weight average molecular weight/number average molecular weight) of 2.2 or more. In particular, it relates to the pressure-sensitive adhesive composition having the above-described constitution, wherein the polyester has been subjected to a crosslinking treatment and the crosslinked polyester preferably comprises solvent-insoluble components in an amount of 10% by weight or more. In addition, it relates to the pressure-sensitive adhesive composition having the above-described constitution, which preferably has a glass transition temperature of −10° C. or lower and a storage elastic modulus at 23° C. of $5 \times 10^5$ Pa or lower.

In addition, the invention relates to a pressure-sensitive adhesive sheet comprising a substrate having provided on one side or both sides thereof a layer comprising the pressure-sensitive adhesive composition of the above-described constitution. Additionally, the term "pressure-sensitive adhesive sheet" usually includes pressure-sensitive adhesive tapes with a narrow width as well as pressure sensitive adhesive sheets with a wide width, and includes known various pressure-sensitive adhesive products such as pressure-sensitive adhesive labels.

DETAILED DESCRIPTION OF THE INVENTION

The polyester of the invention is a polyester obtained by using, as starting material components comprising a polyhydric alcohol component and a polycarboxylic acid component, components essentially comprising (A) an aliphatic diol having the structural unit represented by the foregoing formula (1), i.e., the carbonate structural unit and (B) at least one of a polyhydric alcohol having three or more hydroxyl groups and a polycarboxylic acid having three or more carboxyl groups, and subjecting these components to polycondensation reaction. Here, as the polycarboxylic acid component, dicarboxylic acids are usually used in the case of using as component (B) the polycarboxylic acid having three or more caroxyl groups as well as in the case of not using it. As the polyhydric alcohol component, other aliphatic diols other than the component A may be used in combination. Additionally, in this specification, the term "aliphatic diol" means diols including alicyclic diols.

As the aliphatic diol to be used as the component A, there may be used various aliphatic diols having, in the main chain, the structural unit represented by the foregoing formula (1) wherein R represents a straight or branched hydrocarbon group containing 2 to 20 carbon atoms. For example, there are illustrated carbonate diols such as propylene carbonate diol and hexamethylene carbonate diol; and polycarbonate diols such as those which are obtained by dealcoholation reaction, etc. between a polyhydric alcohol (e.g., ethylene glycol, 1,3-propylene glycol, 1,4-butanediol, 1,6-hexanediol, 3-methyl-1,5-pentanediol or 1,9-nonanediol) and a dialkyl carbonate (e.g., diethylene carbonate or dimethyl carbonate). As commercially available products of the polycarbonate diol, there are illustrated "PLACCEL CD205", "PLACCEL CD210", "PLACCEL CD220", "PLACCEL CD205PL", "PLACCEL CD210PL" and "PLACCEL CD220PL" made by DAICEL CHEMICAL INDUSTRIES, LTD.

As other aliphatic diols than the component A, there are illustrated aliphatic diols having a hydrocarbon side chain and straight chain aliphatic diols. Of these, the aliphatic diols having a hydrocarbon side chain include neopentyl glycol, 2-methyl-1,3-propanediol, 2,2-diethyl-1,3-propanediol, 2-methyl-2-propyl-1,3-propanediol, 2-butyl-2-ethyl-1,3-propanediol, 3-methyl-1,5-pentanediol, 2-methyl-2,4-pentanediol, 2,4-diethyl-1,5-pentanediol, 1,3,5-trimethyl-1,3-pentanediol, 2-methyl-1,6-hexanediol, 2-methyl-1,8-octanediol, 2-methyl-1,9-nonanediol and dimer diol. The straight chain aliphatic diols include ethylene glycol, 1,3-propylene glycol, 1,4-butanediol, 1,5-pentanediol, 1,6-hexanediol, 1,8-octanediol, 1,9-nonanediol, 1,10-decanediol, 1,18-octadecanediol and 1,4-cyclohexanediol.

As the aliphatic diols other than the component A, there may be used, in addition to the above-described aliphatic diols, aliphatic polymer diols such as a polyester diol, a polyether diol and a polycaprolactonediol for easily obtaining polymers having an intended molecular weight. Of these, the polyester diol includes those which are obtained by subjecting at least one of diols such as ethylene glycol, diethylene glycol, 1,4-butanediol, neopentyl glycol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,10-decanediol and octadecanediol and at least one of succinic acid, methylsuccinic acid, adipic acid, pymelic acid, azelaic acid, sebacic acid, 1,12-dodecanoic acid, 1,14-tetradecanedioic acid, acid anhydrides or lower alkyl esters of these carboxylic acids to dehydration reaction. As commercially available products thereof, there are illustrated "Kurarey Polyol P-510", "Kurarey Polyol P-1010", "Kurarey Polyol P-2010", "Kurarey Polyol P-3010" and "Kurarey Polyol P-5010" made by KURAREY CO., LTD. and known as polyester diols between 3-methyl-1,5-pentanediol and adipic acid.

As the polyether diol, there may be illustrated polyethylene glycol, polypropylene glycol and polytetramethylene glycol obtained by ring-opening polymerization of ethylene oxide, propylene oxide and tetrahydrofuran, respectively, and copolyethers obtained by copolymerizing them. As commercially available products thereof, there are illustrated "Adeka Polyether P-400", "Adeka Polyether P-1000", "Adeka Polyether P-2000" and "Adeka Polyether P-3000" made by ASAHI DENKA KOGYO K.K. and known as polyether diols obtained by adding propylene oxide to propylene glycol. As the polycaprolactonediol, there are illustrated caprolactone-based polyester diols obtained by ring-opening polymerization of a cyclic ester monomer such as ε-caprolactone or δ-valerolactone. As commercially available products thereof, there are illustrated "PLACCEL L205AL", "PLACCEL L212AL", "PLACCEL L220AL" and "PLACCEL L230AL" made by DAICEL CHEMICAL INDUSTRIES, LTD.

It is preferred to use the aliphatic diol as the component A in an amount of 30% by weight or more, more preferably 50% by weight or more, of the total amount together with the aliphatic diol other than the component A, i.e., the amount of the total diol components. Because, in case where the amount of the aliphatic diol as the component A is less than 30% by weight of the amount of the total diol components, there results a prepared polyester having a lower mechanical strength and an insufficient heat resistance.

As the component B, one or both of a polyhydric alcohol having three or more hydroxyl groups and a polycarboxylic acid having three or more carboxyl groups. As the polyhydric alcohol having three or more hydroxyl groups, there are illustrated aliphatic polyhydric alcohols such as glycerin, trimethylolpropane, 1,2,4-butanetriol, 1,2,5-pentanetriol, 1,2,6-hexanetriol, pentaerythritol and dipentaerythritol, and derivatives thereof. As the polycarboxylic acid having three or more carboxyl groups, there are illustrated aliphatic polycarboxylic acids such as 1,2,4-butanetricarboxylic acid, 1,2,5-hexanetricarboxylic acid, 1,2,4-cyclohexanetricarboxylic acid and 1,2,3,4-butanetetracarboxylic acid, aromatic polycarboxylic acids such as trimellitic acid and pyromellitic acid, and acid anhydrides, lower alkyl esters or the like thereof.

In addition, as dicarboxylic acids commonly used as a polycarboxylic acid component, there are illustrated aliphatic dicarboxylic acids and aromatic dicarboxylic acids. Specifically, there are illustrated aliphatic dicarboxylic acids such as succinic acid, methylsuccinic acid, adipic acid pymeric acid, azelaic acid, sebacic acid, 1,12-dodecanoic acid, 1,14-tetradecanedioic acid and dimer acid, aromatic dicarboxylic acids such as phthalic acid, 1,4-naphthalenedicarboxylic acid and 4,4'-biphenyldicarboxylic acid, and acid anhydrides, lower alkyl esters or the like thereof.

An optimal amount of at least one of the polyhydric alcohol having three or more hydroxyl groups and the polycarboxylic acid having three or more carboxyl groups as the B component is selected so that the degree of dispersion (weight average molecular weight/number average molecular weight) of the resultant polyester becomes 2.2 or more depending upon the molecular weight and number of the hydroxyl group or the carboxyl group per a molecule. Usually, it is preferred to use the component B in an amount of 2 to 30% by weight, more preferably 4 to 15% by weight, of the total amount of the aliphatic diol and the dicarboxylic acid. In case where the amount of the component B is less than 2% by weight, the resultant polyester tends to have the degree of dispersion of less than 2.2 whereas, in case where more than 20% by weight, the degree of dispersion of the resultant polyester becomes too large, leading to troubles to be described later.

The polyester of the invention is obtained by using the starting material components essentially comprising the component A and the component B and subjecting them to a polycondensation reaction. Processes for producing the polyester are not particularly limited, and a conventionally known one may be employed. For example, there is illustrated a process of conducting simultaneous polycondensation of the starting material components under heating in the presence of a catalyst. The catalyst to be used here is a catalyst to be used for ordinary condensation reactions and includes, specifically, metal compounds such as tetra-n-butyl titanate and antimony trioxide.

The polyester of the invention has a number average molecular weight of 5,000 or more (usually not more than 60,000), preferably 10,000 to 50,000, more preferably 12,000 to 40,000. In case where the number average molecular weight of the polyester is less than 5,000, there is not obtained an enough cohesive force as a pressure-sensitive adhesive, and there tend to result an insufficient heat resistance and an insufficient durability. In case where the number average molecular weight is too large, the polyester becomes so viscous that formation of a pressure-sensitive adhesive sheet becomes difficult. Thus, it is better to adjust the number average molecular weight to be within the above-described range.

The polyester of the invention has a degree of dispersion (weight average molecular weight/number average molecular weight) of 2.2 or more (usually not more than 25), preferably 2.5 to 20, more preferably 2.7 to 15. As has been described hereinbefore, the degree of dispersion of the polyester can be adjusted by properly selecting the amount, number average molecular weight and the number of hydroxyl or carboxyl groups per a molecule of the component B, and it suffices to adjust to a proper degree of dispersion within the above-described range depending upon the end-use. In case where the degree of dispersion is less than 2.2, it becomes difficult to balance the mechanical strength with the flexibility, thus compatibleness of heat resistance with adhesion properties to a rough surface not being attained. In case where the degree of dispersion is too large, the polyester becomes so viscous that gellation is liable to occur and formation of a pressure-sensitive adhesive sheet becomes difficult. Thus, it is better to adjust the degree of dispersion to be within the above-described range.

The pressure-sensitive adhesive composition of the invention comprises the above-described polyester as a major component which is usually subjected to a crosslinking treatment to impart thereto an excellent heat resistance. As the crosslinking treatment, there is a method of using a so-called crosslinking agent wherein a polyfunctional compound having functional groups capable of reacting with at least one of the hydroxyl group and the carboxyl group contained in the polyester such as a polyisocyanate compound, a polyepoxy compound or a polyaziridine compound is added to conduct a crosslinking reaction. Of the crosslinking agents, polyisocyanate compounds are particularly preferred.

As the polyisocyanate compound, there are illustrated lower aliphatic polyisocyanates such as butylene diisocyanate and hexamethylene diisocyanate; alicyclic polyisocyanates such as cyclopentylene diisocyanate, cyclohexylene diisocyanate and isophorone diisocyanate; aromatic polyisocyanates such as 2,4-tolylene diisocyanate, 4,4'-diphenylmethane diisocyanate and xylylene diisocyanate; and isocyanate adducts such as a tolylenediisocyanate adduct and a hexamethylene diisocyanate adduct of trimethylolpropane. These crosslinking agents may be used alone or as a mixture of two or more of them.

Amount of the crosslinking agent can properly be selected depending upon the balance between the molecular weight and the degree of dispersion of the polyester and end-use of the pressure-sensitive adhesive composition. Usually, the crosslinking agent is preferably used in an amount of 0.5 to 10 parts by weight per 100 parts by weight of the polyester and, thus, the crosslinked polyester preferably comprises solvent-insoluble components in an amount of 10% by weight or more, more preferably 20 to 70% by weight. In case where the amount of the solvent-insoluble components is less than 10% by weight, there results a pressure-sensitive adhesive composition having an insufficient cohesive force, thus a sufficient heat resistance not being obtained. On the other hand, in case where the amount of the solvent-insoluble components is too large, there results a pressure-sensitive adhesive composition having a spoiled flexibility, thus adhesion properties to a rough surface becoming inferior. Therefore, it is better to select the amount within the above-described range.

Alternatively, in place of the above-described polyfunctional compounds, a substantial crosslinking agent may be compounded as a polyfunctional monomer, followed by conducting crosslinking by applying electron beams, etc. As such polyfunctional monomer, there are illustrated ethylene glycol di(meth)acrylate, pentaerythritol tri(meth)acrylate, tetramethylolmethane tetra(meth)acrylate and trimethylolpropane tri(meth)acrylate. As is the same with the case of the polyfunctional compounds, amount of the polyfunctional monomer used can properly be selected, and is usually preferably 1 part by weight or more per 100 parts by weight of the polyester so as to adjust the amount of solvent-insoluble components after crosslinking treatment using electron beams to be preferably 10% by weight or more, more preferably 20 to 70% by weight or more.

The pressure-sensitive adhesive composition of the invention comprises the polyester as a major component and is usually subjected to the crosslinking treatment as described above. In the pressure-sensitive adhesive composition may be compounded conventionally known various tackifiers and other various, conventionally known additives such as powders (e.g., inorganic or organic fillers, metal powders and pigments), particulate or foil-like materials, etc. In some cases, it becomes easier to balance the pressure-sensitive adhesive properties by compounding these additives.

The thus constituted pressure-sensitive adhesive composition of the invention preferably has a glass transition temperature (Tg) of $-10°$ C. or lower, more preferably $-20°$ C. or lower (usually $-100°$ C. or higher) and a storage elastic modulus [G'] at 23° C. of $5 \times 10^5$ Pa or less, more preferably $2 \times 10^5$ Pa or less (usually $1 \times 10^4$ Pa or more), shows a good tack, and has a good mechanical strength and a good flexibility and, thus, it exhibits excellent adhesive performance satisfying requirements for heat resistance, durability and adhesion properties to a rough surface at the same time.

The pressure-sensitive adhesive sheet of the invention is obtained by using a varying substrate comprising a plastic film such as a polyethylene terephthalate film or a porous material such as paper or unwoven fabric, applying the pressure-sensitive adhesive composition of the above-described constitution to one side or both sides of the substrate in a dry thickness of usually preferably 10 to 150 $\mu$m, and drying to thereby form a sheet-like or tape-like pressure-sensitive adhesive sheet.

The invention is now described in more detail by reference to Examples, but is not limited thereto at all. Additionally, in the following descriptions, the term "parts" means "parts by weight", and the term "degree of dispersion" means a ratio of (weight average molecular weight/ number average molecular weight) of a polyester.

EXAMPLE 1

In a four-neck separable flask equipped with a stirrer, a thermometer, and a water separator were placed 200 g of a polycarbonate diol (PLACCEL CD220PL; made by DAICEL CHEMICAL INDUSTRIES, LTD.; hydroxyl value: 56.1 KOH mg/g), 10 g of trimethylolpropane, 40.8 g of sebacic acid and 0.14 g of tetra-n-butyl titanate as a catalyst, the temperature of the mixture was raised to 180° C., while stirring in the presence of a small amount of xylene as a reaction water discharging solvent, and the mixture was maintained at the temperature. After a while, the outflow and separation of water were observed and the reaction began to proceed. By continuing the reaction for about 20 hours, there was obtained a polyester having a number average molecular weight of 20,000 and a degree of dispersion of 3.0.

This polyester was diluted with toluene to a solid component concentration of 40% by weight. 2 parts (solid components) of a hexamethylene diisocyanate trimer addition product of trimethylolpropane (Coronate HL; made by NIPPON POLYURETHANE INDUSTRY CO., LTD.) per 100 parts (solid components) of the polyester was added thereto as a crosslinking agent to obtain a pressure-sensitive adhesive composition. This pressure-sensitive adhesive composition was coated on a substrate of a 38 $\mu$m thick polyethylene terephthalate film using an applicator, followed by drying at 130° C. for 5 minutes to form a 50 $\mu$m thick layer comprising the pressure-sensitive adhesive composition, thus a pressure-sensitive adhesive sheet being obtained.

EXAMPLE 2

In a four-neck separable flask equipped with a stirrer, a thermometer, and a reaction by-product separator were placed 100 g of a polycarbonate diol (PLACCEL CD220PL; made by DAICEL CHEMICAL INDUSTRIES, LTD.; hydroxyl value: 56.1 KOH mg/g), 100 g of 3-methyl-1,5-pentanediol, 10 g of trimethylolpropane, 101 g of succinic acid anhydride, and 0.34 g of tetra-n-butyl titanate as a catalyst, the temperature of the mixture was raised to 180° C., while stirring in the presence of a small amount of xylene as a reaction water discharging solvent, and the mixture was maintained at the temperature. After a while, the outflow and separation of water were observed and the reaction began to proceed. By continuing the reaction for about 30 hours, there was obtained a polyester having a number average molecular weight of 25,000 and a degree of dispersion of 4.8.

This polyester was diluted with toluene to a solid component concentration of 40% by weight. 1.5 parts (solid components) of a hexamethylene diisocyanate trimer addition product of trimethylolpropane (Coronate HL; made by NIPPON POLYURETHANE INDUSTRY CO., LTD.) per 100 parts (solid components) of the polyester was added thereto as a crosslinking agent to obtain a pressure-sensitive adhesive composition. In the same manner as in Example 1 using this pressure-sensitive adhesive composition, a layer comprising the pressure-sensitive adhesive composition was provided on a substrate of a polyethylene terephthalate film to obtain a pressure-sensitive adhesive sheet.

EXAMPLE 3

In a four-neck separable flask equipped with a stirrer, a thermometer, and a reaction by-product separator were placed 100 g of a polycarbonate diol (PLACCEL CD220PL; made by DAICEL CHEMICAL INDUSTRIES, LTD.; hydroxyl value: 56.1 KOH mg/g), 100 g of 2-butyl-2-ethyl-1,3-propanediol, 10 g of trimellitic acid anhydride, 15.6 g of sebacic acid, and 0.08 g of tetra-n-butyl titanate as a catalyst, the temperature of the mixture was raised to 180° C., while stirring in the presence of a small amount of xylene as a reaction water discharging solvent, and the mixture was maintained at the temperature. After a while, the outflow and separation of water were observed and the reaction began to proceed. By continuing the reaction for about 20 hours, there was obtained a polyester having a number average molecular weight of 15,000 and a degree of dispersion of 3.2.

This polyester was diluted with toluene to a solid component concentration of 40% by weight. 2 parts (solid components) of a hexamethylene diisocyanate trimer addition product of trimethylolpropane (Coronate HL; made by NIPPON POLYURETHANE INDUSTRY CO., LTD.) per 100 parts (solid components) of the polyester was added thereto as a crosslinking agent to obtain a pressure-sensitive adhesive composition. In the same manner as in Example 1 using this pressure-sensitive adhesive composition, a layer comprising the pressure-sensitive adhesive composition was provided on a substrate of a polyethylene terephthalate film to obtain a pressure-sensitive adhesive sheet.

EXAMPLE 4

3 parts (solid components) of trimethylolpropane triacrylate was compounded as a substantial crosslinking agent in 100 parts (solid components) of the polyester obtained in Example 1 to prepare a pressure-sensitive adhesive composition. This pressure-sensitive adhesive composition was coated on a substrate of a 38 μm thick polyethylene terephthalate film using an applicator, followed by drying at 100° C. for 5 minutes to form a 50 μm thick layer comprising the pressure-sensitive adhesive composition. This layer was then irradiated with electron beams in a radiation amount of 6 Mrad to be crosslinked, thus a pressure-sensitive adhesive sheet being obtained.

COMPARATIVE EXAMPLE 1

In a four-neck separable flask equipped with a stirrer, a thermometer, and a water separator were placed 200 g of a polycarbonate diol (PLACCEL CD220PL; made by DAICEL CHEMICAL INDUSTRIES, LTD.; hydroxyl value: 56.1 KOH mg/g), 20.2 g of sebacic acid, and 0.07 g of tetra-n-butyl titanate as a catalyst, the temperature of the mixture was raised to 180° C., while stirring in the presence of a small amount of xylene as a reaction water discharging solvent, and the mixture was maintained at the temperature. After a while, the outflow and separation of water were observed and the reaction began to proceed. By continuing the reaction for about 20 hours, there was obtained a polyester having a number average molecular weight of 32,000 and a degree of dispersion of 1.6.

This polyester was diluted with toluene to a solid component concentration of 40% by weight. 5 parts (solid components) of a hexamethylene diisocyanate trimer addition product of trimethylolpropane (Coronate HL; made by NIPPON POLYURETHANE INDUSTRY CO., LTD.) per 100 parts (solid components) of the polyester was added thereto as a crosslinking agent to obtain a pressure-sensitive adhesive composition. In the same manner as in Example 1 using this pressure-sensitive adhesive composition, a layer comprising the pressure-sensitive adhesive composition was provided on a substrate of a polyethylene terephthalate film to obtain a pressure-sensitive adhesive sheet.

COMPARATIVE EXAMPLE 2

In a four-neck separable flask equipped with a stirrer, a thermometer, and a reaction by-product separator were placed 200 g of a polyester diol (KURAREY POLYOL P-2010; made by KURAREY CO., LTD.; hydroxyl value: 56.1 KOH mg/g), 13 g of trimethylolpropane, 23.3 g of succinic acid anhydride, and 0.16 g of tetra-n-butyl titanate as a catalyst, the temperature of the mixture was raised to 180° C., while stirring in the presence of a small amount of xylene as a reaction water discharging solvent, and the mixture was maintained at the temperature. After a while, the outflow and separation of water were observed and the reaction began to proceed. By continuing the reaction for about 30 hours, there was obtained a polyester having a number average molecular weight of 18,000 and a degree of dispersion of 13.4.

This polyester was diluted with toluene to a solid component concentration of 40% by weight. 2 parts (solid components) of a hexamethylene diisocyanate trimer addition product of trimethylolpropane (Coronate HL; made by NIPPON POLYURETHANE INDUSTRY CO., LTD.) per 100 parts (solid components) of the polyester was added thereto as a crosslinking agent to obtain a pressure-sensitive adhesive composition. In the same manner as in Example 1 using this pressure-sensitive adhesive composition, a layer comprising the pressure-sensitive adhesive composition was provided on a substrate of a polyethylene terephthalate film to obtain a pressure-sensitive adhesive sheet.

With respect to each of the pressure-sensitive adhesive sheets obtained in Examples 1 to 4 and Comparative Examples 1 and 2, storage elastic modulus, glass transition temperature and solvent-insoluble components were measured in the following manner. The results are as shown in Table 1.

Measurement of Storage Elastic Modulus

The term "storage elastic modulus [G']" means a shear storage elastic modulus, which is said to be an elastic component of a strain generated upon a stress being applied from outside. This measurement was conducted by a system of measuring using a dynamic viscoelasticity measurement apparatus ARES manufactured by Rheometrics, Inc. by a jig of parallel plate of a sample thickness of about 1.0 mm and a diameter of 7.9 mm at a frequency of 1 Hz at room temperature (23° C.).

Measurement of Glass Transition Temperature

A temperature at which a loss modulus, measured by a system of measuring using a dynamic viscoelasticity measurement apparatus ARES manufactured by Rheometrics, Inc. by a jig of parallel plate of a sample thickness of about 1.0 mm and a diameter of 7.9 mm at a frequency of 1 Hz, becomes a peak value was taken as the glass transition temperature.

Measurement of Solvent-insoluble Components

About 0.1 g of each of the pressure-sensitive adhesive compositions was sampled and weighed accurately (Y1). Then, this sample was immersed in about 50 ml of toluene at room temperature for 5 days, and solvent-insoluble component was taken out and dried at 130° C. for about 1 hour, followed by weighing (Y2). Contents of the solvent-insoluble components (X) (% by weight) of the pressure-sensitive adhesive compositions were calculated from the weights of each of the samples measured before and after immersing it in the solvent according to the following formula:

$$X \text{ (\% by weight)} = Y2(g)/Y1(g) \times 100$$

TABLE 1

|  | Storage Elastic Modulus [G'] (Pa) | Glass Transition Temperature [Tg] (° C.) | Solvent-Insoluble Components (% by weight) |
|---|---|---|---|
| Example 1 | $1.5 \times 10^5$ | −50 | 35 |
| Example 2 | $9.3 \times 10^4$ | −60 | 40 |
| Example 3 | $2.0 \times 10^5$ | −51 | 32 |
| Example 4 | $1.2 \times 10^5$ | −50 | 33 |
| Comp. Ex. 1 | $6.2 \times 10^5$ | −50 | 60 |
| Comp. Ex. 2 | $5.2 \times 10^4$ | −65 | 44 |

Next, with respect to each of the pressure-sensitive adhesive sheets obtained in Examples 1 to 4 and Comparative Examples 1 and 2, adhesion properties to a rough surface and heat resistance were measured in the following manner. The results thus obtained are shown in Table 2.

Measurement of Adhesion Properties to a Rough Surface

A pressure-sensitive adhesive tape (20 mm×100 mm) was stuck to an aluminum plate having been abraded with a #180 sand paper, using a 500 g roller, and the 180 degree peel adhesive strength was measured under the conditions of an atmospheric temperature of 23° C., a stuck time of 10 seconds, and a releasing rate of 300 mm/min.

Measurement of Heat Resistance

Each pressure-sensitive adhesive tape was stuck to a bakelite plate as an adherend in an adhesion area of 10 mm×20 mm, a load of 1 kg was applied to the perpendicular direction at an atmospheric temperature of 80° C., and the holding time (minute) until the tape falls was measured.

TABLE 2

|  | Adhesion properties to Rough Surface (N/20 mm width) | Heat Resistance (min) |
|---|---|---|
| Example 1 | 4.0 | 120 or more |
| Example 2 | 4.5 | 120 or more |
| Example 3 | 3.2 | 120 or more |
| Example 4 | 3.7 | 120 or more |
| Comp. Example 1 | 0.2 | 120 or more |
| Comp. Example 2 | 3.4 | 19 |

As is apparent from the results shown in Table 2, each of the pressure-sensitive adhesive sheets of the invention obtained in Examples 1 to 4 showed better adhesion properties to a rough surface than the pressure-sensitive adhesive sheet of Comparative Example 1 using the polyester prepared by not using the component B as a starting material component, and showed a better heat resistance than the pressure-sensitive adhesive sheet of Comparative Example 2 using the polyester prepared by not using the component A, thus being confirmed to satisfy the requirements for both adhesion properties to a rough surface and heat resistance at the same time.

As has been described hereinbefore, the invention can provide a pressure-sensitive adhesive composition and a pressure-sensitive adhesive tape made therefrom which have a satisfactory heat resistance and satisfactory adhesion properties to a rough surface and can find wide applications, by using as starting material components for a polyester a specific aliphatic diol having a carbonate structure and a polyhydric alcohol having three or more hydroxyl groups or a polycarboxylic acid having three or more carboxyl groups to thereby attain both a good mechanical strength and a good flexibility of the resultant polyester.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition which comprises a polyester obtained from starting material components comprising:

(A) an aliphatic diol having in the main chain a structural unit represented by the following formula (1):

wherein R represents a straight or branched hydrocarbon group having 2 to 20 carbon atoms; and (B) at least one component selected from the group consisting of (i) a polyhydric alcohol having three or more hydroxyl groups, and (ii) a polycarboxylic acid having three or more carboxyl groups;

said polyester having a number average molecular weight of 5,000 or more, a degree of dispersion of 2.2 or more, and a storage elastic modulus at 23° C. of $1.5 \times 10^5$ Pa or less.

2. The pressure-sensitive adhesive composition as claimed in claim 1, wherein the polyester has been subjected to a crosslinking treatment and the crosslinked polyester comprises solvent-insoluble components in an amount of 10% by weight or more.

3. The pressure-sensitive adhesive composition as claimed in claim 1, which has a glass transition temperature of −10° C. or lower.

4. A pressure-sensitive adhesive sheet comprising a substrate having provided on one side or both sides thereof a layer comprising the pressure-sensitive adhesive composition claimed in claim 1.

* * * * *